United States Patent
Brant et al.

[11] Patent Number: 5,881,465
[45] Date of Patent: Mar. 16, 1999

[54] LINE HEAD FOR FLEXIBLE LINE TRIMMER

[75] Inventors: Ron Brant, Houghton; Michael S. Houge; Lloyd H. Tuggle, both of Shreveport, all of La.

[73] Assignee: WCI Outdoor Products, Inc., Cleveland, Ohio

[21] Appl. No.: 812,447

[22] Filed: Mar. 6, 1997

Related U.S. Application Data

[63] Continuation of Ser. No. 371,282, Jan. 11, 1995, abandoned, which is a continuation-in-part of Ser. No. 225,375, Apr. 8, 1994, abandoned.

[51] Int. Cl.$^6$ ............................. A01D 34/68; A01G 3/06
[52] U.S. Cl. ......................... 30/276; 56/12.7; 242/597.4
[58] Field of Search ..................... 30/276, 347; 56/12.7; 242/297.4, 602.3, 613.1

[56] References Cited

U.S. PATENT DOCUMENTS

| | | | |
|---|---|---|---|
| 726,147 | 4/1903 | Dodge | 242/613.1 X |
| 1,319,429 | 10/1919 | Spiro . | |
| 1,822,422 | 9/1931 | Richardson | 242/613.1 X |
| 2,087,002 | 7/1937 | Miehle, Jr. . | |
| 3,502,279 | 3/1970 | Bundschuh et al. . | |
| 4,089,114 | 5/1978 | Doolittle et al. | 30/276 |
| 4,124,938 | 11/1978 | Ballas, Sr. | 30/276 |
| 4,134,204 | 1/1979 | Perdue | 30/276 |
| 4,151,646 | 5/1979 | Lane | 30/276 |
| 4,161,820 | 7/1979 | Moore | 30/276 |
| 4,167,812 | 9/1979 | Moore | 30/276 |
| 4,168,572 | 9/1979 | Ewing | 30/276 |
| 4,183,138 | 1/1980 | Mitchell et al. | 30/276 |
| 4,189,830 | 2/1980 | Pittinger, Jr. | 30/276 |
| 4,202,094 | 5/1980 | Kalmar | 30/276 |
| 4,203,212 | 5/1980 | Proulx | 30/276 |
| 4,236,309 | 12/1980 | Cayou | 30/276 |
| 4,259,782 | 4/1981 | Proulx | 30/276 |
| 4,269,372 | 5/1981 | Kwater . | |
| 4,281,505 | 8/1981 | Fuelling, Jr. et al. | 30/276 X |
| 4,285,127 | 8/1981 | Zerrer et al. | 30/276 |
| 4,369,577 | 1/1983 | Gise et al. | 30/276 |
| 4,412,382 | 11/1983 | White, III | 30/276 |
| 4,490,910 | 1/1985 | Mattson et al. | 30/276 |
| 4,524,515 | 6/1985 | Oberg | 30/276 |
| 4,557,052 | 12/1985 | Baba et al. | 30/276 |
| 4,566,189 | 1/1986 | Muto | 30/276 |
| 4,584,771 | 4/1986 | Tillotson | 30/276 |
| 4,633,588 | 1/1987 | Pittinger, Jr. | 30/347 |
| 4,672,798 | 6/1987 | Ota | 30/276 X |
| 4,702,005 | 10/1987 | Pittinger, Sr. et al. | 30/276 |
| 4,790,071 | 12/1988 | Helmig et al. | 30/276 |
| 4,823,465 | 4/1989 | Collins | 30/276 |
| 4,959,904 | 10/1990 | Proulx | 30/276 |
| 5,060,384 | 10/1991 | Everts | 30/276 |
| 5,335,883 | 8/1994 | Mawer | 242/613.1 X |

*Primary Examiner*—Eugenia A. Jones
*Attorney, Agent, or Firm*—Marc A. Hubbard; Munsch Hardt Kopf & Harr, P.C.

[57] ABSTRACT

A "bump-feed" type line head (108) and replaceable spool (116) for a flexible line trimmer are specially adapted for removing and mounting the spool in a single manual movement to the line head to facilitate spool and line replacement. A U-shaped retention spring (118) is snap-fitted without separate fasteners within a hub in the line head on which the spool is journalled. The spring includes knob-shaped sections (122) protruding through the hub, beneath the spool, for retaining the spool on the hub without interfering with a bump-feed indexing mechanism. Pulling the spool from or pushing the spool onto the hub tends to deflect the knobs inwardly, allowing removal of the spool from the hub. The spool includes an integrally formed reel (116) and an integrally formed button (130) connected in a single movement to the bottom of the reel using undercut surfaces (136)(138), forming a cavity having a radius sufficient to accommodate extension of the knobs beneath the spool.

17 Claims, 6 Drawing Sheets

LINE HEAD FOR FLEXIBLE LINE TRIMMER

This Application is a continuation of application Ser. No. 08/371,282 filed Jan. 11, 1995 now abandoned, which application Ser. No. 08/371,282 is a Continuation-in-Part of application Ser. No. 08/225,375 filed Apr. 8, 1994 now abandoned for LINE HEAD FOR FLEXIBLE LINE TRIMMER, being incorporated herein for all purposes by reference.

FIELD OF INVENTION

The invention relates generally to vegetation cutters and more particularly to line heads for flexible line trimmers.

BACKGROUND OF THE INVENTION

To overcome what is generally perceived to be the major deficiency of flexible line trimmers, a great deal of effort has been directed in the past to methods of making replenishing broken cutting line more convenient for users without substantially complicating and increasing the cost of a line trimmer. A standard approach is to sell a supply of replacement line on a spool and have the user mount it in a line head that is coupled to the motor of the line trimmer. A line head typically includes a hub, coupled to the output shaft of a motor, and a housing or shroud extending outwardly from the hub and down around the spool to protect the spool from dirt and debris. The user places the spool on the hub, feeds a small length of line through an opening in the housing, and places a cover over the spool to retain and protect the spool within the line head. The spool is locked to the hub so that rapid spinning of the line head flails the line. When line breaks, the spool is unlocked and spun on the hub to unwind line through the opening.

Several methods have been used to lock and unlock the spool against the hub. Early line heads used a manual release mechanism. To replace line, the trimmer was stopped and turned upside down. The locking mechanism was released manually and the spool turned to unwind and feed line. To avoid having to stop and turn the trimmer upside to feed line, most current line heads have a "bump-feed" mechanism that indexes the spool through a predetermined angle of rotation each time it is bumped against the ground, thus allowing the user to feed a predetermined amount of line while the trimmer is running. There also exist line heads which automatically index the spool without any intervention of the user. Generally, these heads sense a change in the centrifugal force acting on a component of the spinning head or on the flailing line to release the spool for rotation and pay-out line when the line becomes short.

Though bump-feed and automatic line heads provide a great deal of convenience for the user, once a supply of flexible line on a spool is exhausted, the line trimmer must be turned on its side or upside down and held in an unwieldy position to replace the empty spool with another spool pre-wound with line and reattach the cover. Covers of line heads are often attached to the line head in a manner that demands such dexterity and strength to unfasten and remove that many users become frustrated by the task of replacing a spool.

One approach to make spool replacement easier is to locate the spool in the handle of the trimmer, near the user. Examples of these configurations are illustrated in U.S. Pat. No. 4,369,577 of Gise, et al. and U.S. Pat. No. 4,285,128 of Schnell, et al. However, the line must then be fed through the handle shaft of the trimmer motor and then through line head, replacing one potentially frustrating task with another. U.S. Pat. No. 4,633,588 to Pittinger, Jr., on the other hand, retains the spool in the line head, but attempts to provide for an improved spool fastening mechanism that does not require removal of a cover. Instead, its fastening mechanism is released through a pin extending through the bottom of the spool. This pin-actuated release mechanism has, however, several disadvantages. It has several moving parts and is relatively complicated. It thus tends to be more expensive to manufacture and is more susceptible to sticking or interference from accumulation of dirt and debris around the pin and the fastening mechanism. The spool could thus be prematurely released during use or the pin become very difficult to push to release the spool.

SUMMARY OF THE INVENTION

The invention is a line head for a flexible line trimmer having a spool retention mechanism that allows a spool to be removed from a line head in a single movement by a user simply pulling down on the spool. The spool may also be replaced in a single movement by pushing the spool into the line head. No fasteners need to be released or covers removed. Furthermore, the spool mechanism is simple, inexpensive to manufacture and assemble, and is less susceptible to the adverse effects of dirt and debris.

According to one aspect of the invention, a line head includes a retention member mounted within a downwardly facing socket defined within a hub in the center of the line head without extra fasteners. The retention member extends radially outwardly from the hub under the spool and engages the bottom of the spool. The spool is thus free to rotate and to move upwardly on the hub. Manually pushing a spool onto or pulling the spool off of the hub pushes the retention member radially inwardly, permitting the spool to be mounted and released in a single movement. The retention member is inserted through the bottom of the hub and snapped into place in a single movement, thus securing it against movement without separate fasteners such as screws.

In accordance with another aspect of the invention, the socket in the hub electrically insulates the retention member from the drive shaft of an AC electric motor to which the line head is attached. A metal arbor extending through the plastic injection molded hub is not necessary for attaching the retention member to the line head as no separate fastener is required to attach the retention member within the socket. The AC motor is thereby double insulated for safety.

In accordance with yet another aspect of the invention, a spool for a line head, which includes a hub formed around the spool's axis of rotation and disk-shaped flanges located on opposite ends of the hub extending perpendicularly to the axis of rotation, is specially adapted to reduce the tendency of line to "nest." A line "nests" when it becomes entangled in a manner that resembles a bird's nest. Nesting is a nuisance to a user. It interferes with replacing the spool in the line head and the line feeding operation of the line head. When the line is being wound, nesting will also tend to spread the flanges of the spool, which interferes with spool replacement and feeding line from the line head. To help to overcome this problem, a spool is formed with a series of grooves or ridges formed around the outer circumference of the hub, parallel to the flanges. The grooves or ridges tend to reduce lateral movement of inner layers of line as additional layers of line are wound and unwound over inner layers of line.

In a preferred embodiment, a retention member is a form of a spring which includes four legs extending downwardly when mounted within a socket of the hub. Two of the opposed legs flare outwardly through slots in a side wall of the hub and then back inwardly to form knob-shaped tabs depressible by application of pressure to the surfaces of the tabs in either direction parallel to the axis of the hub. When the spool is fully mounted on the hub, the bottom of the spool clears the tabs, allowing the tabs to spring outwardly and thereby retain the spool on the hub. Pushing a spool onto or pulling it from the hub depresses the tabs of the spring, releasing the spool. To retain the spring within the hub without the need for fasteners, the other two opposed legs of the spring are bent outwardly to form retaining tabs for fitting into slots within the sides of the socket. The spring is easily fabricated and installed in the hub of the line head by inserting the retention member into the socket, the retaining tabs snapping into the slots within the hub. It also has a minimal number of moving parts or surfaces, thus lessening the adverse effects of dirt and debris generated by using the line trimmer.

These and other features and advantages invention are described in or will be apparent from the following detailed description of the preferred embodiment of the invention as illustrated in the accompanying drawings.

DESCRIPTION OF PREFERRED EMBODIMENTS

Like numbers refer to like parts in the following description.

Figure 1:
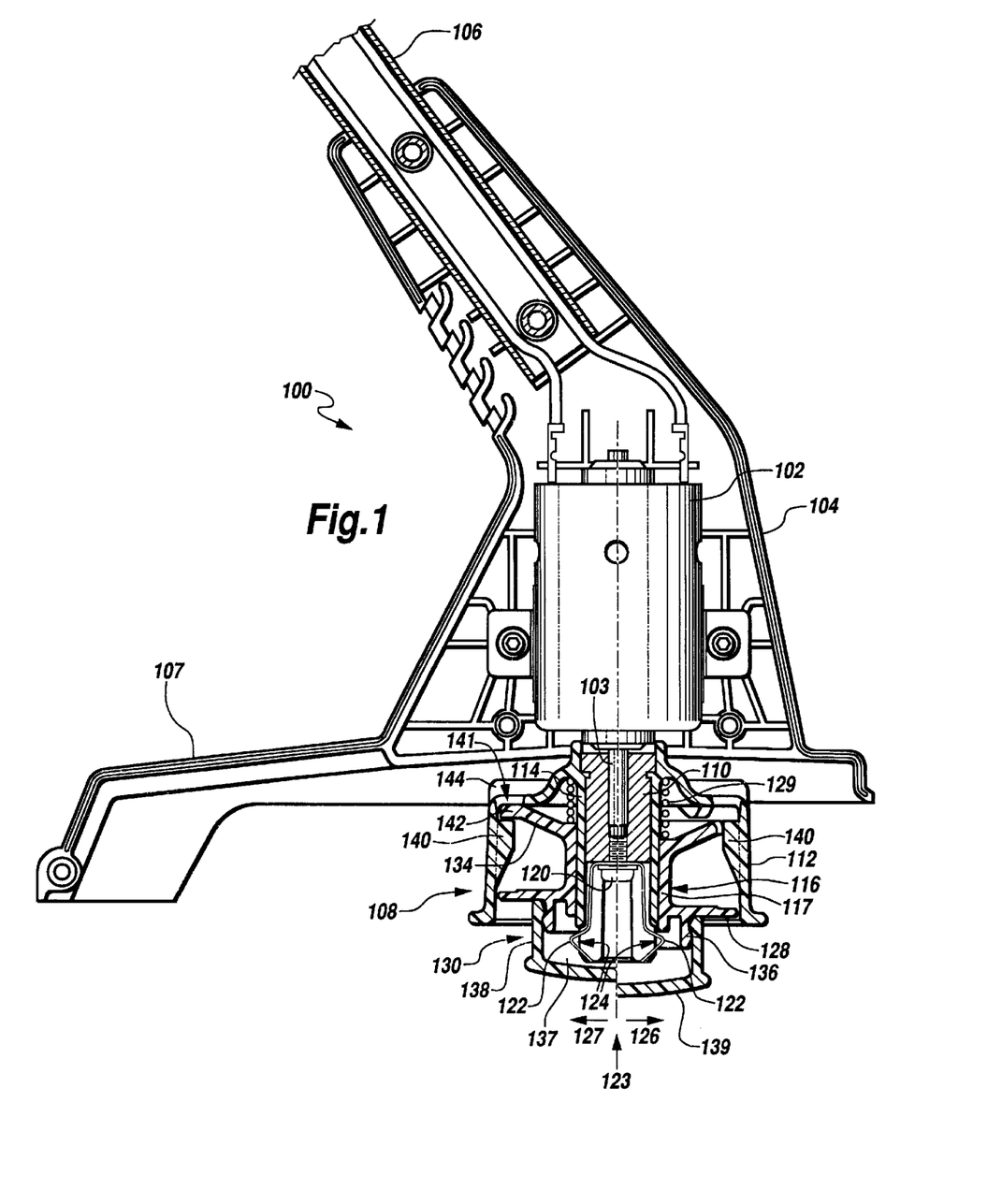
FIG. 1 is a cross-section through a motor housing section of a flexible line trimmer and a line head, the line head split along its axis of rotation to show a spool in two axially displaced operating positions.

Referring now to FIG. 1, an electric flexible line trimmer 100 includes an electric motor 102 mounted within motor housing 104. The motor housing is manufactured in two halves, the right half being removed for purposes of illustration. The motor's output shaft 103 is generally vertical with respect to the ground when the flexible line trimmer is held in a normal operating position. Tubular handle support tube 106 is attached to the upper end of the housing 104. The housing includes an integrally formed shield 107. Though not shown, mounted to the upper end of the handle support tube 106 is a handle with a trigger switch for turning on and off a flow of current to the motor. The trimmer may also include an auxiliary handle to assist in holding and maneuvering the trimmer. The electric flexible line trimmer illustrated is just one example of flexible line trimmers generally other types include those powered by internal combustion engines. Heavier engines are usually located at the opposite end of the support tube 106 for better balance and are coupled to the line head through a shaft extending through the middle of the support tube 106.

The output shaft 103 of motor 102 is coupled to a line head 108 through a metal arbor 110. The arbor includes a socket that receives the end of the output shaft 103 of the motor. The arbor is attached to a hub 114 of the line head for transmitting torque from the shaft 103 to the hub. Integrally formed with hub 114 is line head housing 112, formed from a circular skirt extending outwardly from the hub and then down around the hub. This cup-shaped housing defines a cavity in which a reel or spool 116 is mounted for rotation about the hub. The spool includes a hollow, cylindrical hub section 117 for mounting the spool on the hub 114 for rotation. The spool thus rotates on the hub about the same axis of rotation as the line head. The spool is normally wound with a supply of flexible, monofilament line (not shown). Bottom side wall 128 and top side wall 134 of the spool are integrally formed with the spool's hub 117 and assist in retaining line wound on the spool. Bottom side wall 128 is solid and also forms a bottom wall of the line head housing.

Figure 5:
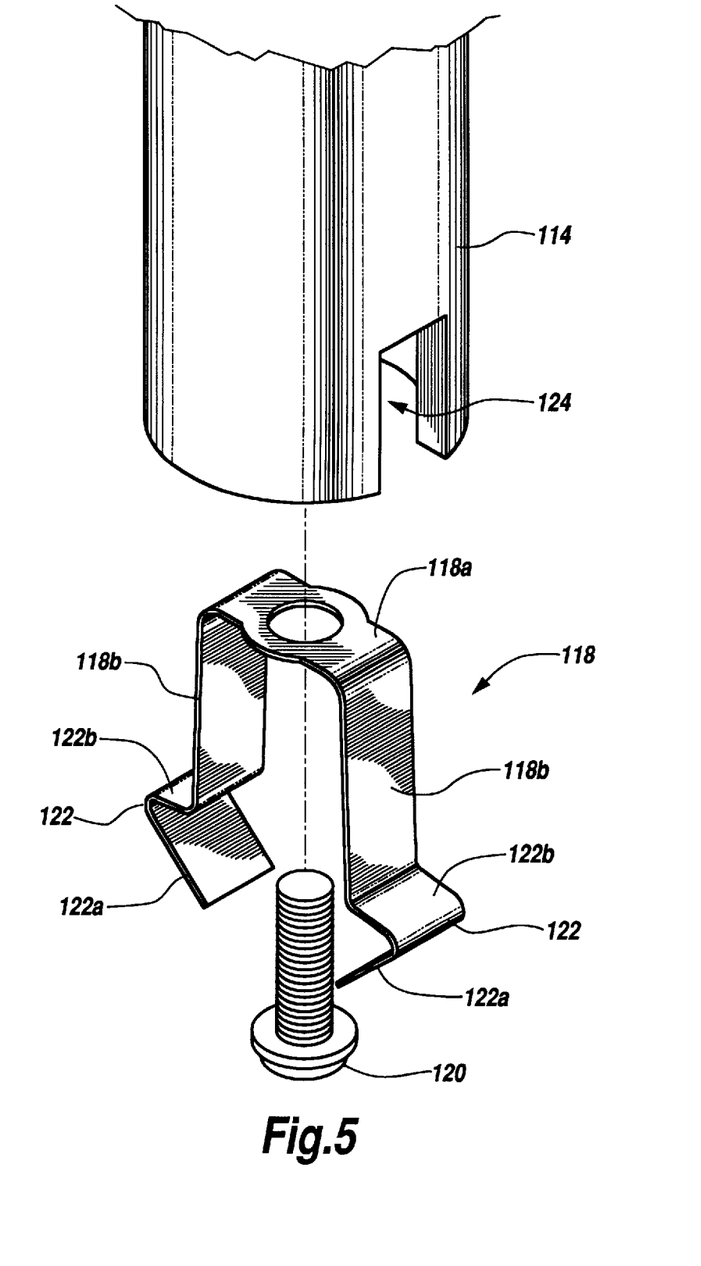
FIG. 5 is an exploded view of a spool retention assembly portion in the line head of FIG. 1.

Referring to FIGS. 1 and 5 together, the cylindrically-shaped line head hub 114 has a hollow center or bore, into which the arbor extends and in which a retention spring 118 is mounted. Retention spring 118 is a generally U-shaped leaf spring. It has a relatively flat mid section 118a, with a hole through which a screw 120 extends to attach the spring to the arbor. It also has two downwardly extending legs 118b. The bottom portion of each leg is bent to form a knob 122. Each knob extends outwardly through slots 124 formed through the side of the hub 114. The spring 118 is compressed by the inside walls of the hubs 114, providing a bias to the knobs in their fully extended position as shown. Each knob has two exterior surfaces 122a and 122b exposed when fully extended through a slot. Each surface is slanted or angled obliquely with respect to the axis of rotation of the hub, which axis indicated by dashed line 123. A force applied to either surface that is substantially parallel to the axis of rotation of the hub generates, when combined with the ramp offered by the surfaces 122a and 122b, a force perpendicular to the axis of the hub which has a magnitude sufficient to overcome the biasing force of spring 118 tends to deflect the knobs inwardly to the point that the peak of each knob lies within the radius of the hub of the spool. The spool is thus able to be pulled off of or pushed onto the hub 114 in a single movement.

Referring now only to FIG. 1, line head 108 is illustrated split along the axis of rotation of the spool, indicated by line 123, to show it in two operating positions. Side 126 of the line shows the spool in a first normal operating position and side 127 shows it in a second, axially displaced operating position. The spool 116 is biased to its first operating position by compressed coiled spring 129. The knobs 122 abut the bottom edge of the spool hub 117 when it is in the first operating position to hold or retain the spool on the hub. Swiftly hitting or bumping button 130 against the ground axially displaces the spool to its second operating position.

The spool 116 and the button 130 are formed by separate injection molding processes and then permanently joined in a single movement. A circular ridge or rim 136 is formed on the bottom side of the spool surrounding the center of the spool. The ridge has an undercut formed on its outer circumference or surface. The radius of the ridge with respect to the axis of rotation of the hub, is large enough to accommodate the knobs 122 when fully extended below the spool. The button is circular and is generally shaped like a bowl, with a cavity 137 formed by side walls 138 extending perpendicularly upward from a bottom wall or surface 139 of the button. The bottom of the button has a convex outer surface that assists in bumping the line head when the surface of the ground is uneven or the trimmer is being held at an angle and also reduces the friction when bumped on a hard, flat surface. On the inside of the rim of the sides 138 of the button is formed an undercut that complements and mates with the undercut on the ridge 136 of the spool. During factory assembly, the spool and button are pushed together so that the undercuts on the spool and undercut on the button hook each other, thus securely attaching the spool and button in a single movement without fasteners. The hooked rims of the button and spool also seal the inside surfaces of the spool's hub, helping to prevent dirt and debris kicked up during use from interfering with rotation of the spool in the line head and its removal. The radius of the cavity 137 is greater than the radius of the hub, permitting the knobs 122 of the spring to extend radially outward beneath the spool. The depth of the cavity 137 in the button is also large enough to accommodate the knobs when the spool is displaced upwardly to the second operating position, thus permitting the spool to rotate freely. Also, if the head is used with electrically powered units as shown in FIG. 1, fins 144 are molded at the top of the hub. These fins create an air flow that cools the electric motor. Also if debris wraps around the head, it may create problems if it reaches the motor shaft. To avoid this problem, the hub is extended in such a way that shields the motor output shaft and bearing.

Figure 2A:
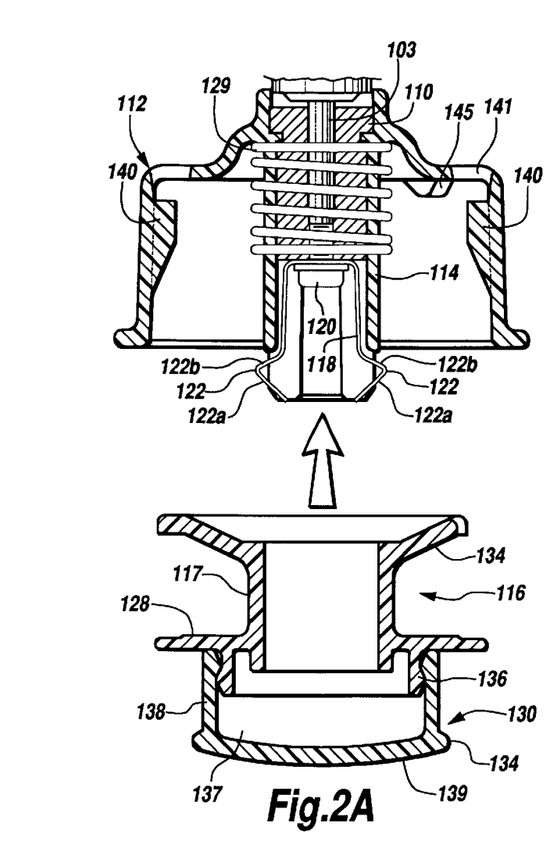
FIG. 2A is a cross-section of the line head of FIG. 1, illustrating the spool and button assembly fully removed from the line head.
Figure 2B:
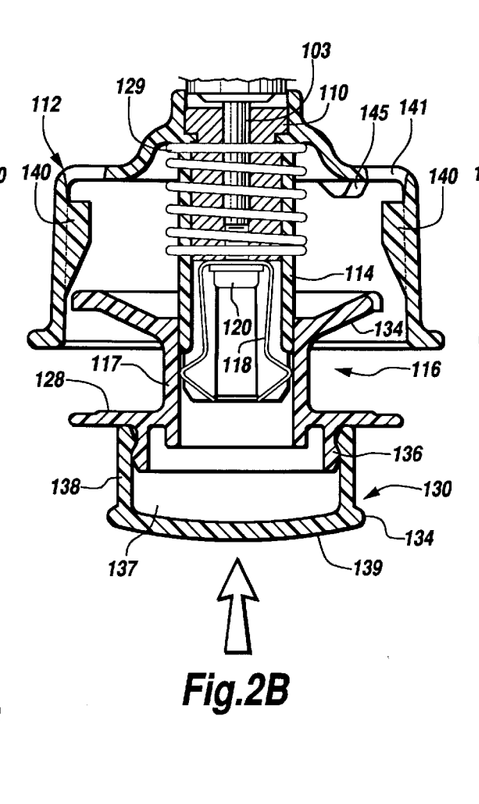
FIG. 2B is a cross-section of the line head of FIG. 1 that illustrates the position of the spool and button assembly as it is being removed from or inserted into the line head.
Figure 2C:
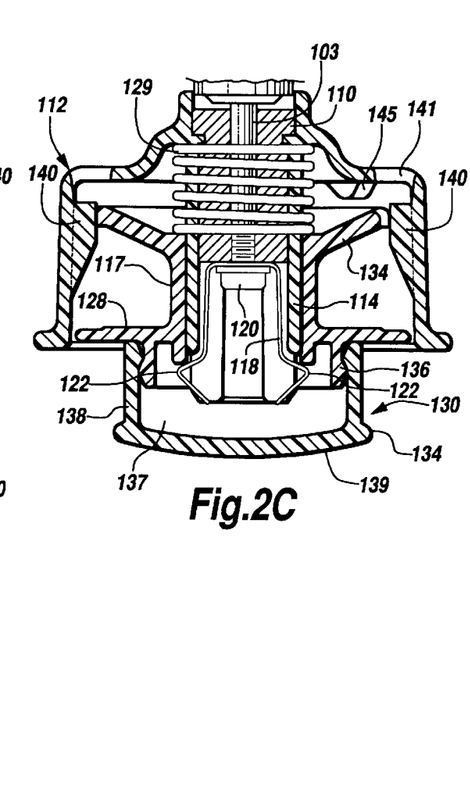
FIG. 2C is a cross-section of the line head of FIGS. 1 and 3 with the spool and button assembly fully mounted within the line head.

Referring now to FIGS. 2A, 2B and 2C, these figures illustrate spool 116, assembled with button 130, being mounted onto the hub 114 in a single movement. In FIG. 2A, the assembly is fully removed. To mount the assembly, an operator grasps the button 130, aligns the hub of the spool with the hub of the line head, and pushes the top edge of the spool's hub against the lower surface 122a of the knobs 122. The angle of the lower surface 122a, which angle is taken with respect a lever arm extending roughly between the screw 120 (about which each leg of the retention spring bends to be compressed) and the knob, is less than that of the upper surface 122b, creating greater leverage to compress the retention spring. This makes mounting the spool easier than removing it. The tab angles and the biasing force of the spring is set so that most persons have the strength to comfortably overcome the biasing force of the spring to deflect the knobs inwardly.

In FIG. 2B, knobs 122 have been fully deflected, creating sufficient clearance to permit the spool to slide on or off of the hub 114 of the line head.

In FIG. 2C, once the spool 116 is slide past the knobs 122, the knobs spring back under the biasing force of the retention spring. As previously indicated, the knobs retain the spool and button assembly in the line head during normal operation. The biasing force applied by the retention spring, as well as centrifugal forces acting on the retention spring and its knobs when the line head is rapidly spinning, are sufficient to counteract forces experienced during normal operation that would tend to move the spool downward with respect to the line head.

The assembly of the spool 116 and button 130 is removed from the line head (after the line has been depleted for example) in a single movement similar to that used to slide the spool and button assembly on to the hub. A user grasps the button 130 and, assisted by ledge 134 on the outer circumference of the button, pulls down, causing the bottom edge of the spool's hub 117 to deflect the knobs inwardly to the point shown in FIG. 2B. The spool is then free to be pulled off the hub by the user. The user may then replace the spool, if depleted of line, with a spool wound with line. Replacement spool and button assemblies are sold as a unit and wound with a full supply of line so that replenishing line is very easily and quickly accomplished.

Figure 3:
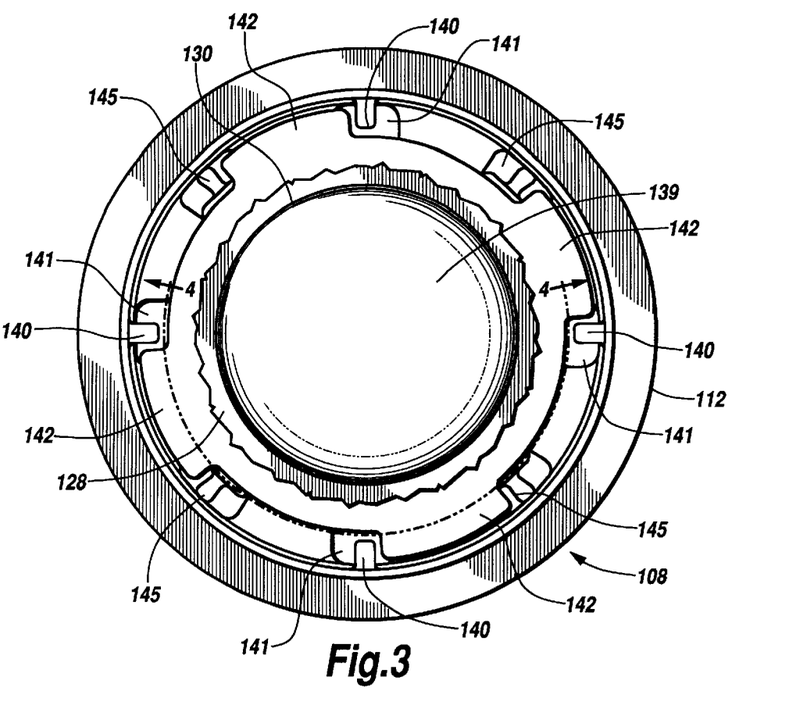
FIG. 3 is a bottom plan view of the line head of FIG. 1 with a portion of a bottom wall of the spool partly removed.
Figure 4:
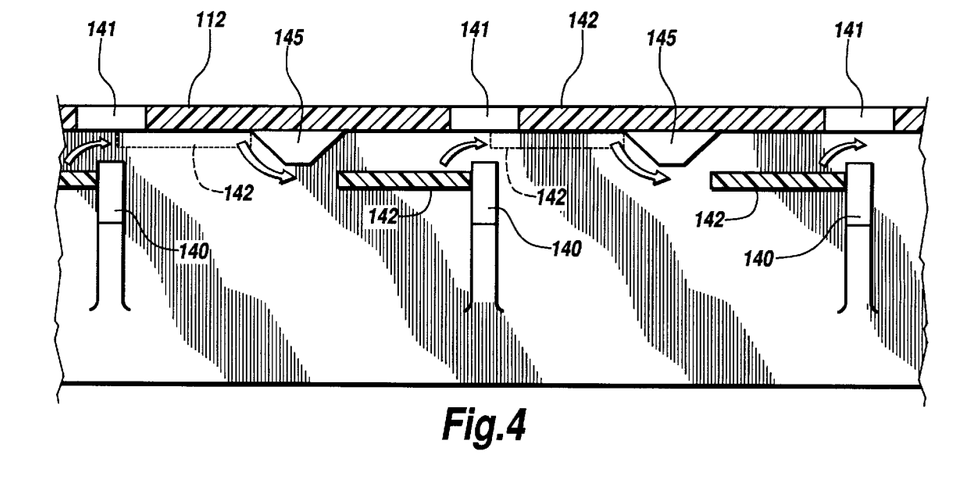
FIG. 4 is a section of the line head illustrated in FIG. 3, taken along Section line 4—4.

Referring now to FIGS. 1, 3 and 4, line head 108 includes an indexing mechanism comprised of a set of stepped detentes that function to pay out a predetermined amount of line in response to the bottom 130 being bumped swiftly against the ground.

In the first operation position, shown on side 126 of line 123 (FIG. 1), spool 116 is held against line head 108 for rotation with the line head by the cooperation of series of tab-like stops 140 projecting radially inwardly from the inner surface of housing 112 and ears 142 projecting radially outwardly from the edge of the upper side wall 134 of the spool 116. When the head starts spinning, the centrifugal force acting over the line outside of the spool moves the ears of the spool 142 against the stops 140. Rotation of the line head causes the stops 140 to engage ears 142, and thus rotate the spool with the line head. Stops 140 are equally spaced apart and integrally formed with the line head hub 114 and housing 112 during an injection molding process. Openings 141 are caused by the insertion into and retraction from the mold of pins that define the top edge of each stop during the injection molding process. Ears 142 are spaced apart at intervals equal to those of the stops. The ears are integrally formed on the spool during the injection molding process.

To feed or pay out a predetermined length of line from the line head 108 during operation, button 130 is hit swiftly against the ground, moving the spool 116 axially upward from the first operating position to the second or displaced operating position, shown on side 128 of line 123 in FIG. 1. Each ear 142 moves upward and over the top of stop 140, against which it had been held, thus releasing the spool 116 and allowing it to slip on hub 114 as the line head spins. A set of protuberances 145, stepped upwardly and displaced circumferentially from the stops 140, project inwardly from the line head housing in the plane of rotation of the ears when the spool is displaced. Each protuberance is spaced midway between adjacent stops 140. The protuberances stop rotation of the spool while the tap button is held against the ground when it is in the second displaced position, and assist in deflecting the ears 142 downwardly, under the urging of compressed spring 129 (FIG. 1) once the ears have moved past the stops 140. The spool then continues to slip in the first operating position until the ears engage the stops 140. The surfaces of the protuberances 145 are angled and face downwardly to assist in deflecting the ears downwardly toward the first operating position.

Figure 6:
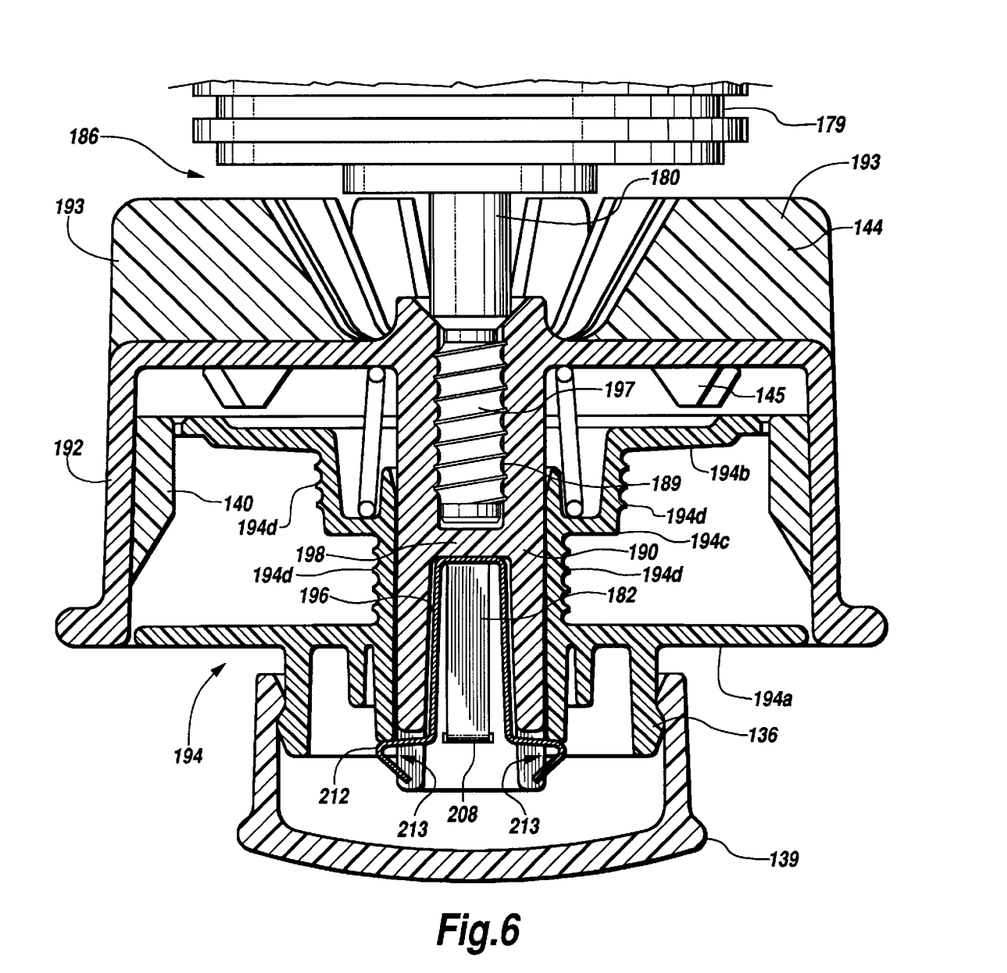
FIG. 6 is a section of an alternative embodiment of the line head.

Referring now to FIG. 6, the illustrated line head is specially adapted to be driven by an alternating current electric motor 179. The end of the motor's output shaft 180 is formed with self-tapping threads 197 so that it can be screwed into hole 189. Hole 189 is formed in the top of plastic hub 190 during a conventional plastic injecting molding process and is coaxial with the axis of rotation of the line head housing 192. A plurality of fins 193 on the upper surface of housing 192 cool the electric motor 179. Housing 192 includes a circular skirt extending around the housing hub 190 that defines a cavity in which a spool 194 is mounted for rotation on hub 190 about an axis common with line head 186. Spool 194 includes upper and lower flanges 194a and 194b integrally formed with and extending radially from spool hub 194c. Integrally formed on the outer surface of the spool hub 194c is a groove 194d that wraps around the circumference of the hub in a spiral fashion. The groove has a semi-circular cross section with a radius approximately the same or slightly larger than the radius of flexible monofilament line (not shown) that is normally wound around the spool hub. The groove, or the ridges formed between adjacent turns of the groove, tends to hold the line in place and reduce the tendency of the line to move laterally on the spool's hub, in the direction of its axis of rotation, as additional layers of line are wound around or unwound from the hub. Within a lower section of the hub 190 is defined during the injection molding process a socket 196 having a downward facing opening for receiving metal retention spring 182. The retention spring is electrically insulated from the output shaft 180 by wall 198.

Figure 7:
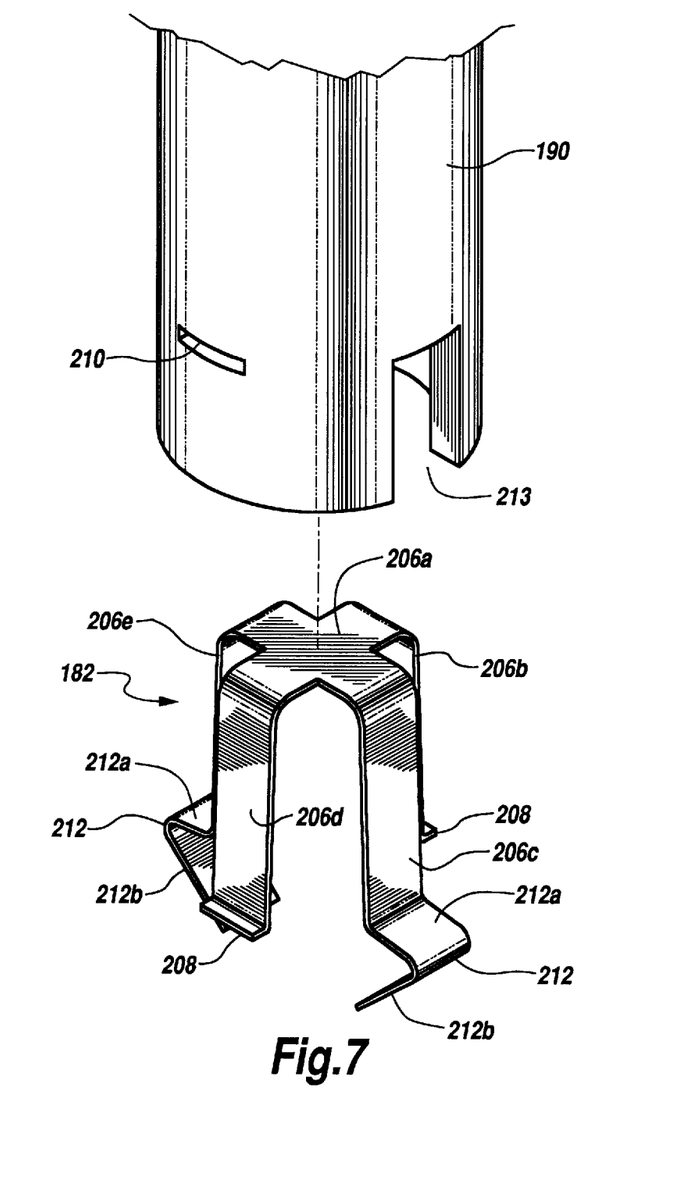
FIG. 7 is an exploded perspective view of an alternative embodiment of the spool retention assembly in the line head of FIG. 6.

Referring now to FIGS. 6 and 7 together, the retention spring 182 is a generally cross-shaped piece of metal bent to form a four-leg leaf spring. It has a relatively flat midsection 206a, with four downwardly extending legs (206b, 206c, 206d, 206e). A bottom edge of each of a first opposed pair of legs (206b, 206d) are bent outward to form a flat tab 208 that fits into a slot 210 defined on opposite sides of the wall of the hub 190. Positioning the tabs 208 within the slots 210 secures the spring 182 against movement and twisting within socket 196. During assembly of the line head, retention spring is inserted into opening of the socket and mounted in a single movement. The first opposed pair of legs deflect inwardly during insertion until the tabs 208 align with and snap into slots 210. Each leg acts as a compressed spring that applies force sufficient to maintain registration of the tab with the slot and thereby essentially locks the retention spring into the socket. Mounting the spring 182 in this manner not only simplifies assembly of the line head, but it also makes possible elimination of a metal arbor or other metal components conventionally found within the line hub to which a fastener, such as a screw, would attach to retain the spring.

A second opposed pair of legs (206c, 206e) have bottom portions bent to form a knob 212. Each knob 212 extends outwardly through slots 213 formed through the side of hub 190. The spring 182 is slightly compressed by the inside wall of socket 196 providing a bias to the knobs 212 in their fully extended position as shown. Each knob 212 has two exterior surfaces 212a and 212b exposed when fully extended through a slot 213. Each exterior surface (212a, 212b) is slanted or angled obliquely with respect to the axis of rotation of the hub 190. A portion of a force applied to either exterior surface (212a, 212b) that is substantially parallel to the axis of rotation of the hub 190 is directed by the ramp formed by the surfaces into a direction generally perpendicular to the axis of the hub, tending to cause the knobs to deflect inwardly against the biasing force of the spring, to the point that the peak of each knob lies within the radius of the hub section 202 of the spool 194. The spool 194 is thus able to be pulled off or pushed onto the hub in a single movement.

The invention has been described in connection with a preferred embodiment. Alterations, modifications, rearrangements, substitutions and omissions may be made in the preferred embodiment without departing from the spirit and scope of the invention as set forth in the appended claims.

What is claimed is:

1. A line head for a flexible line trimmer comprising:
   a spool for carrying a supply of flexible cutting line;
   a housing including means for coupling to a rotary shaft and a hub for receiving the spool for rotation thereon, the hub having an inside surface defining therein a socket; and
   means, mounted within the socket and biased outwardly beyond the hub, for retaining the spool on the hub during cutting operations and for being pushed inwardly against a bias by movement of the spool against said means for retaining during the spool's removal from the hub, said means for retaining including means for mounting the means for retaining within the socket without a need for an additional fastener.

2. The line head of claim 1 wherein the hub is formed of electrically insulated material and wherein the socket defined therein electrically insulates the means for retaining from the means for coupling to a rotary shaft.

3. The line head of claim 2 wherein the means for coupling the line head includes a plastic portion of the housing defining a hole.

4. The line head of claim 1 wherein the means for retaining includes a first knob extending radially beyond the hub for engaging the spool.

5. The line head of claim 4 wherein the means for retaining includes a leaf spring having a first leg and a second leg, the first leg being bent to define the first knob.

6. The line head of claim 5 wherein the spring further includes a third leg and a fourth leg, the third leg having a second knob extending outwardly from the hub opposite the first knob, and wherein the means for mounting includes the fourth leg.

7. The line head of claim 5 wherein the means for mounting further includes a tab formed on the second leg.

8. The line head of claim 7 wherein the inside surface of the hub has defined therein a slot for receiving the tab.

9. A line head for a flexible line trimmer comprising:
   spool for carrying a supply of flexible cutting line;
   a housing including means for coupling to a rotary shaft, and a hub for receiving the spool for rotation thereon about an axis, the hub having defined therein a socket; and
   a retention member mounted within the socket defined in the hub, the retention member including a first knob biased for extending radially beyond the hub and having an engaging surface facing generally toward the housing in a direction oblique to the axis for engaging the spool to retain the spool on the hub during normal operation, and a first tab being received by a slot formed in the socket;
   wherein manually moving the spool axially on the hub against the first knob deflects the first knob inwardly, against the bias, for enabling release of the spool from the hub in a single movement and wherein the first tab enables the retention member to be held within the socket without a need for an additional fastener.

10. The line head of claim 3 wherein the spring is a leaf spring having a first leg and a second leg, the first leg urging the knob radially outwardly and the second leg urging the first tab into the slot.

11. The line head of claim 10 wherein an end of the first leg is bent to form the first knob and wherein an end of the second leg is bent to form the first tab.

12. The line head of claim 9 wherein the hub is formed of electrically insulated material and wherein the socket defined therein electrically insulates the retention member from the means for coupling to a rotary shaft.

13. The line head of claim 12 wherein the means for coupling the line head includes a plastic portion of the housing defining an unthreaded hole for receiving a self-tapping, threaded portion of a rotary shaft.

14. A line head for a flexible line trimmer comprising:

a spool for carrying a supply of flexible cutting line;

a housing including means for coupling to a rotary shaft and a hub for receiving thereon the spool for rotation about an axis, the hub having a socket defined therein and a slot formed in a source of the hub; and a spring mounted within the socket, the spring having a first leg and a second leg, the first leg having a first knob extending radially outwardly from the hub, the first knob having an engaging surface facing generally toward the housing in a direction oblique to the axis for engaging and retaining the spool on the hub during normal operation, and the second leg having a first tab received by the slot.

15. The line head of claim 14 wherein the spring further includes a third leg and a fourth leg, the third leg including a second knob urged outwardly from the hub by the spring and the fourth leg including a second tab received by a second slot in the socket.

16. The line head of claim 15 wherein an end of the first leg is bent to form the first knob, an end of the second leg is bent to form the first tab, an end of the third leg is bent to form the second knob and an end of the fourth leg is bent to form the second tab.

17. A powered lawn trimming apparatus comprising, an electric motor;

a line head coupled with the electric motor, the line head including, a spool for carrying a supply of flexible cutting line, a housing including means for coupling to a rotary shaft and a hub for receiving the spool for rotation thereon, the hub having an inside surface defining therein a socket; and means, mounted within the socket and biased outwardly beyond the hub, for retaining the spool on the hub during cutting operations and for being pushed inwardly against a bias by movement of the spool against said means for retaining during the spool's removal from the hub, said means for retaining including means for mounting the means for retaining within the socket without a need for an additional fastener, the means for retaining including a first knob extending radially beyond the hub for engaging the spool;

wherein the means for retaining includes a leaf spring having a first leg and a second leg, the first leg being bent to define the first knob.

* * * * *